United States Patent

Erdtmann et al.

[11] Patent Number: 6,152,999
[45] Date of Patent: Nov. 28, 2000

[54] COLOR PIGMENTED INK JET SET

[75] Inventors: David Erdtmann; Barbara L. Grady; David J. Oldfield, all of Rochester; Frank R. Brockler, Macedon, all of N.Y.

[73] Assignee: Eastman Kodak Company, Rochester, N.Y.

[21] Appl. No.: 09/300,829

[22] Filed: Apr. 27, 1999

[51] Int. Cl.$^7$ ..................................................... C09D 11/02
[52] U.S. Cl. .................. 106/31.6; 106/31.77; 106/31.78; 106/31.79; 106/31.8; 106/31.81
[58] Field of Search ............................... 106/31.6, 31.77, 106/31.78, 31.79, 31.8, 31.81

[56] References Cited

U.S. PATENT DOCUMENTS

| | | | |
|---|---|---|---|
| 4,311,775 | 1/1982 | Regan | 430/37 |
| 4,818,285 | 4/1989 | Causley et al. | 106/31.27 |
| 5,679,139 | 10/1997 | McInerney et al. | 106/31.6 |
| 5,738,716 | 4/1998 | Santilli et al. | 106/31.77 |
| 5,846,306 | 12/1998 | Kubota et al. | 106/31.75 |
| 5,993,527 | 11/1999 | Tochihara et al. | 106/31.78 |
| 5,994,427 | 11/1999 | Kappele et al. | 106/31.6 |
| 6,039,796 | 3/2000 | Kubota et al. | 106/31.6 |
| 6,075,069 | 6/2000 | Takemoto | 106/31.6 |

OTHER PUBLICATIONS

"Industrial Organic Pigments", Herbst et al., 1993, pp. 4–6 and 271–273, 281 and 282, no month available.

*Primary Examiner*—Helene Klemanski
*Attorney, Agent, or Firm*—Harold E. Cole

[57] ABSTRACT

A color ink jet ink set for color printing; comprising
  (a) a first ink comprises a carrier and a bridged aluminum phthalocyanine pigment as a cyan colorant;
  (b) a second ink comprising a carrier and a quinacridone pigment as a magenta colorant;
  (c) a third ink comprising a carrier and a non-benzidine yellow pigment as a yellow colorant; and
  (d) at least one additional ink comprising a carrier and a colorant which is:
    (i) an orange colorant comprising a Naphthol AS, β-Naphthol, diketopyrrolo-pyrrole or a disazopyrazolone pigment;
    (ii) a green colorant comprising a copper phthalocyanine green or a triarylcarbonium pigment; or
    (iii) a violet colorant comprising a quinacridone, triarylcarbonium, benzimidazolone, or a dioxazine pigment.

14 Claims, No Drawings

COLOR PIGMENTED INK JET SET

FIELD OF THE INVENTION

This invention relates to the field of ink jet printing, particularly color printing.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

U.S. Pat. No. 5,738,716 relates to a color pigmented ink jet ink set comprising a bridged aluminum phthalocyanine pigment, Pigment Red 122, Pigment Yellow 74, and Pigment Black 7. However, there exists a need for an ink set with greater than four colorants (CMYK) which exhibits both superior color gamut and lightfastness.

It is an object of this invention to provide an ink jet ink set for color printing which has both superior color gamut and lightfastness.

SUMMARY OF THE INVENTION

These and other objects are achieved in accordance with the present invention comprising a color ink jet ink set for color printing comprising
  (a) a first ink comprising a carrier and a bridged aluminum phthalocyanine pigment as a cyan colorant;
  (b) a second ink comprising a carrier and a quinacridone pigment as a magenta colorant;
  (c) a third ink comprising a carrier and a non-benzidine yellow pigment as a yellow colorant; and
  (d) at least one additional ink comprising a carrier and a colorant which is:
    (i) an orange colorant comprising a Naphthol Reds, β-naphthol, diketopyrrolo-pyrrole or a disazopyrazolone pigment;
    (ii) a green colorant comprising a copper phthalocyanine green or a triarylcarbonium pigment; or
    (iii) a violet colorant comprising a quinacridone, triarylcarbonium, benzimidazolone, or a dioxazine pigment.

This color ink jet ink set provides color gamuts suitable for pictorial imaging and exceptional lightfastness. Pigment Black 7 can be added to further increased the available color gamuts of this ink set.

Pigments referred to by pigment numbers are numbers assigned by Color Index.

DETAILED DESCRIPTION OF THE INVENTION

The inks of the present invention are intended to be used in four- five-, six-, or seven-color ink jet printers, e.g., printers which contain print cartridges capable of printing cyan, magenta, yellow and orange (CMYO four-color printers), cyan, magenta, yellow, black and orange (CMYKO five-color printers), or cyan, magenta, yellow, black, orange, and green (CMYKOG six-color printers), or cyan, magenta, yellow, black, orange, green, and violet (CMYKOGV seven-color printers).

Bridged aluminum phthalocyanine pigments useful in the invention are described in U.S. Pat. No. 4,311,775, the disclosure of which is hereby incorporated by reference. These pigments may be generically represented by the following formulas:

or

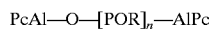

where Pc represents a substituted or unsubstituted phthalocyanine ring, R is an alkyl group, an aryl group, or an aralkyl group, and n is an integer from 0 to 4. A useful siloxane-bridged aluminum phthalocyanine is bis(phthalocyanylalumino)tetraphenyldisiloxane (Pc is unsubstituted, R is phenyl, and n is 2).

In a preferred embodiment, the cyan bridged aluminum phthalocyanine pigment is bis(phthalocyanylalumino)tetraphenyl-disiloxane. In another preferred embodiment, the cyan colorant is a mixture of bis(phthalocyanyalumino)tetraphenyldisiloxane with either (a) copper phthalocyanine, or (b) hydroxyaluminum phthalocyanine or (c) both copper phthalocyanine and hydroxyaluminum phthalocyanine.

In another preferred embodiment of the invention the quinacridone pigment is Pigment Red 122.

Non-benzidine yellow pigments useful in the invention include Pigment Yellow 74, 97, 138, 139, 151, 154, 155, 185, 180 or mixtures thereof. In a preferred embodiment, the yellow pigment is Pigment Yellow 74 or Pigment Yellow 155.

In a preferred embodiment of the invention, the orange colorant comprises a β-naphthol pigment or a Naphthol Reds pigment. Orange colorants useful in the invention include Pigment Orange 5, Pigment Red 17, Pigment Red 188, Pigment Orange 62, Pigment Red 112, Pigment Red 255, Pigment Red 264, and Pigment Red 49:2, and mixtures thereof.

In a preferred embodiment of the invention, the green colorant comprises a copper phthalocyanine green pigment. Green colorants useful in the invention include Pigment Green 1, Pigment Green 2, Pigment Green 7, and Pigment Green 36, and mixtures thereof.

In a preferred embodiment of the invention, the violet colorant comprises a quinacridone or a benzimidazolone pigment. Violet colorants useful in the invention Pigment Violet 19, Pigment Violet 3, Pigment Violet 32, and Pigment Violet 23, and mixtures thereof.

A preferred 5-color ink set useful in the invention comprises Pigment Black 7, Pigment Red 122, Pigment Yellow 74, bis(phthalocyanylalumino)tetraphenyldisiloxane, and Pigment Orange 5.

A preferred 6-color pigmented ink set useful in the invention comprises Pigment Black 7, Pigment Red 122, Pigment Yellow 74, bis(phthalocyanylalumino) tetraphenyldisiloxane, Pigment Orange 5, and Pigment Green 36. Another preferred 6-color pigmented ink set comprises Pigment Black 7, Pigment Red 122, Pigment Yellow 74, bis(phthalocyanylalumino)-tetraphenyldisiloxane, Pigment Red 188, and Pigment Green 36.

A preferred 7-color pigmented ink set useful in the invention comprises Pigment Black 7, Pigment Red 122, Pigment Yellow 74, bis(phthalocyanylalumino) tetraphenyldisiloxane, Pigment Orange 5, Pigment Green 36, and Pigment Violet 3. Another preferred 7-color pigmented ink set comprises Pigment Black 7, Pigment Red 122, Pigment Yellow 74, bis(phthalocyanylalumino) tetraphenyldisiloxane, Pigment Red 188, Pigment Green 36, and Pigment Violet 3.

The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a useful embodiment, the grinding media can comprise particles, preferably substantially spherical in shape, e.g., beads, consisting essentially of a polymeric resin.

In general, polymeric resins suitable for use as milling media are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin®, vinyl chloride polymers and copolymers, polyurethanes, polyamides, poly (tetrafluoroethylenes), e.g., Teflon®, and other fluoropolymers, high density polyethylenes, polypropylenes, cellulose ethers and esters such as cellulose acetate, poly(hydroxyethylmethacrylate), poly(hydroxyethyl acrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm$^3$. Higher density resins are especially useful inasmuch as it is believed that these provide more efficient particle size reduction. Especially useful are crosslinked or uncrosslinked polymeric media based on styrene.

Milling can take place in any suitable grinding mill. Suitable mills include an airjet mill, a roller mill, a ball mill, an attritor mill and a bead mill. A high speed mill is particularly useful.

By high speed mill is meant milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, π, and the impeller diameter. Sufficient milling media velocity is achieved, for example, in a Cowles-type saw tooth impeller having a diameter of 40 mm when operated at 9,000 rev/min. Useful proportions of the milling media, the pigment, the liquid dispersion medium and dispersant can vary within wide limits and depends, for example, upon the particular material selected and the size and density of the milling media etc. The process can be carried out in a continuous or batch mode.

Batch Milling

A slurry of <100 μm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling

A slurry of <100 μm milling media, liquid, pigment and dispersant may be continuously recirculated from a holding vessel through a conventional media mill which has a media separator screen adjusted to >100 μm to allow free passage of the media throughout the circuit. After milling is complete, the dispersion of active material is separated from the grinding media by simple sieving or filtration.

With either of the above modes, the useful amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Useful dispersants for aqueous ink jet inks include sodium dodecyl sulfate, acrylic and styrene-acrylic copolymers, such as those disclosed in U.S. Pat. Nos. 5,085,698 and 5,172,133, and styrenics, such as those disclosed in U.S. Pat. No. 4,597,794. Other patents referred to above in connection with pigment availability also disclose a wide variety of useful dispersants. The dispersant used in the examples is sodium N-methyl-N-oleoyl taurate (OMT).

The milling time can vary widely and depends upon the pigment, mechanical means and residence conditions selected, the initial and desired final particle size, etc. For aqueous mill grinds using the useful pigments, dispersants, and milling media described above, milling times will typically range from 1 to 100 hours. The milled pigment concentrate is preferably separated from the milling media by filtration.

The aqueous carrier medium is water or a mixture of water and at least one water miscible co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2)

ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigments, and may be as high as approximately 75% in come cases, since inorganic pigments generally have higher specific gravities than organic pigments.

The amount of aqueous carrier medium is in the range of approximately 70 to 98 weight %, preferably approximately 90 to 98 weight %, based on the total weight of the ink. A mixture of water and a polyhydric alcohol, such as diethylene glycol, is useful as the aqueous carrier medium. In the case of a mixture of water and diethylene glycol, the aqueous carrier medium usually contains from about 30% water/70% diethylene glycol to about 95% water/5% diethylene glycol. Useful ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or co-solvent, is commonly added to help prevent the ink from drying out or crusting in the orifices of the printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, pH adjusters, buffers, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks comprising five-, six-, and seven-color sets of pigments of the present invention can be used in any of the popular ink jet printing systems, including thermal or piezoelectric drop-on-demand printers and continuous ink jet printers. Of course, the specific ink formulations will vary depending upon the type of ink jet printing system.

The inks of the present invention are most advantageously used in conjunction with photographic quality ink jet paper, such as that manufactured and sold by the Eastman Kodak Company. This is because the optical density and color gamut are enhanced when the inks of the present invention are deposited on this type of paper. However, these inks will also be useful for printing on a variety of transparent and opaque films, and even on so-called plain papers.

The following examples are provided to further illustrate the invention.

EXAMPLE 1

| | |
|---|---|
| Mill Grind | 325.0 g |
| Polymeric beads, mean diameter of 50 μm (milling media) | |
| Black Pearls 880 (Pigment Black) from Cabot Chemical Company | 30 g |

-continued

| Oleoyl methyl taurine, (OMT) sodium salt | 10.5 g |
| Deionized water | 209.5 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 μm KIMAX® Buchner Funnel obtained from VWR Scientific Products. An aliquot of the above dispersion to yield 1.12 g pigment was mixed with 3.18 g diethylene glycol, 4.82 g glycerol, and additional deionized water for a total of 50.0 g. This ink was filtered through a 3-μm filter and introduced into an empty Hewlett-Packard 51626A print cartridge. Images were made with a Hewlett-Packard DeskJet® 540 printer.

Test images comprising patches of varying densities or percentage coverages of the ink, including 100% coverage (Dmax) were printed on a glossy ink jet paper sold by Eastman Kodak Co. as "Heavy Weight Photographic Quality Inkjet Paper". These images were used to measure lightfastness, reflectance spectra, and densitometry.

Lightfastness was measured by comparing the optical density of the Dmax patch before and after treatment with a high intensity (50 Klux) xenon lamp for 7 weeks, filtered with a piece of window glass to simulate sunlight coming through an office window. One day of exposure under these conditions is approximately equivalent to one year under ambient conditions. The results are shown in Table 1.

EXAMPLE 2

A pigmented magenta ink jet ink was prepared and tested as in Example 1 except that it used Pigment Red 122 (Sunfast Quinacridone Pigment obtained from Sun Chemical Corporation).

EXAMPLE 3

A pigmented orange ink jet ink was prepared and tested as in Example 1 except that it used Pigment Orange 5 (BASF SICO® Orange).

EXAMPLE 4

A pigmented yellow ink jet ink was prepared and tested as in Example 1 except that it used Pigment Yellow 74 (11-2510 Hansa® Brilliant Yellow 5GX obtained from Hoechst Chemical Co.).

EXAMPLE 5

A pigmented orange ink jet ink was prepared and tested as in Example 1 except that it used Pigment Red 188 (Novaperm® Red HF3S obtained from Hoechst Corp.).

EXAMPLE 6

A pigmented orange ink jet ink was prepared and tested as in Example 1 except that it used Pigment Orange 62 (Novaperm® Orange H5G-70 obtained from Hoechst Corp.).

EXAMPLE 7

A pigmented orange ink jet ink was prepared and tested as in Example 1 except that it used Pigment Red 112 (SICO® Fast Red L3855 obtained from BASF Corp.).

EXAMPLE 8

A pigmented orange ink jet ink was prepared and tested as in Example 1 except it used Pigment Red 49:2 (Lithol Scarlet NBK-4451 obtained from BASF Corp.).

EXAMPLE 9

A pigmented cyan ink jet ink was prepared and tested as in Example 1 except that it used bridged aluminum phthalocyanine (bis(phthalocyanylalumino)tetraphenyldisiloxane) (Eastman Kodak Co.).

EXAMPLE 10

A pigmented green ink jet ink was prepared and tested as in Example 1 except that it used Pigment Green 1 (Chemisperse® CG2174 obtained from Aztech Corp.).

EXAMPLE 11

A pigmented green ink jet ink was prepared and tested as in Example 1 except that it used Pigment Green 2 (Chemisperse® CG3080 obtained from Aztech Corp.).

EXAMPLE 12

A pigmented green ink jet ink was prepared and tested as in Example 1 except that it used Pigment Green 36 (464-0036 obtained from Sun Chemical Corp.).

EXAMPLE 13

A pigmented violet ink jet ink was prepared and tested as in Example 1 except that it used Pigment Violet 19 (Hostaperm® ER-02 13-7011 obtained from Hoechst Corp.).

EXAMPLE 14

A pigmented violet ink jet ink was prepared and tested as in Example 1 except that it used Pigment Violet 3 (Chemisperse® CV8030 obtained from Aztech Corp.).

EXAMPLE 15

A pigmented violet ink jet ink was prepared and tested as in Example 1 except that it used Pigment Violet 32 (Bordeaux® HF3R 13-3390 obtained from Hoechst Corp.).

EXAMPLE 16

A pigmented violet ink jet ink was prepared and tested as in Example 1 except that it used Pigment Violet 23 (Hostaperm® 14-4006 obtained from Hoechst Corp.).

EXAMPLE 17

A pigmented orange ink jet ink was prepared and tested as in Example 1 except that it used Pigment Red 17 (Sunbright® MR17 obtained from Sun Chemical Corp.).

EXAMPLE 18

A pigmented orange ink jet ink was prepared and tested as in Example 1 except that it used Pigment Red 255 (Cromophtal® Red BP obtained from Ciba Chemical Corp.).

EXAMPLE 19

A pigmented orange ink jet ink was prepared and tested as in Example 1 except that it used Pigment Red 264 (Irgazin® DPP Rubine obtained from Ciba Chemical Corp.).

TABLE 1

| Example | Pigment | % Loss in Optical Density after Exposure |
|---|---|---|
| 1 | Black 7 | None |
| 2 | Red 122 | 8 |
| 3 | Orange 5 | 13 |
| 4 | Yellow 74 | 10 |
| 5 | Red 188 | 6 |
| 6 | Orange 62 | 9 |
| 7 | Red 112 | 4 |
| 8 | Red 49:2 | 16 |
| 9 | Bis(phthalocyanylalumino)tetraphenyldisiloxane | None |
| 10 | Green 1 | 23 |
| 11 | Green 2 | 27 |
| 12 | Green 36 | None |
| 13 | Violet 19 | 5 |
| 14 | Violet 3 | 2 |
| 15 | Violet 32 | 1 |
| 16 | Violet 23 | 6 |
| 17 | Red 17 | 8 |
| 18 | Red 255 | None |
| 19 | Red 264 | 4 |

The above results show that the pigments used in the invention have good lightfastness.

Comparative Example 20

A prior art color ink jet set consisting of the inks used in the Hewlett-Packard DeskJet® 755CM ink jet printer was evaluated for comparative purposes. This ink set comprises a pigmented black (Pigment Black 7) ink, and cyan (Direct Blue 199/Acid Blue 9), magenta (Reactive Red 180/Acid Red 52), and yellow (Basacid Yellow 132), dye-based inks. These inks were printed on a glossy photographic ink jet paper manufactured by Eastman Kodak Co. These inks exhibit the following percent fade in optical density when exposed under the same conditions as in Example 1 except for only one week: black: 2%, cyan: 15%, magenta: 20%, yellow: 39%. The color gamut of this ink set is included in Table 2, Example 20.

Comparative Example 21

The lightfastness and color gamut of a silver halide based imaging system was evaluated for comparative purposes. Test images were printed on Ektacolor® Edge II paper and were evaluated for lightfastness and color gamut. The cyan, magenta, and yellow dyes produced by this system exhibit the following percent fade in optical density when exposed under the same conditions as described in comparative Example 20: cyan: 9%, magenta: 12%, yellow: 19%. The color gamut of this color set is included in Table 2, Example 21.

Color Gamut

Theoretical color gamuts were calculated by the following procedure. The results are set forth in Table 2. In general, the larger the gamut, the more possible colors that a given ink set can reproduce.

All density values are based on integral spectral reflectance measurements made on a MacBeth® 2145 Spectrophotometer. A Xenon pulsed source was used with a 10 mm nominal aperture. Reflectance measurements were made over 380 to 750 nanometer wavelength range in intervals of 10 nanometers. The geometry employed was 45/0.

The calculation of gamut was determined by using the actual optical densities at Dmax of each of the inks in each ink set. Characteristic vector analysis was used to construct a characteristic absorption curve over the range of the visible spectrum (380–750 nm) for each of the inks. The characteristic vector for each ink is a two-dimensional array of optical density vs. wavelength. This technique is described by A. J. Sant in *Photographic Science and Engineering*, 5(3), May–June, 1961, and by J. L. Simonds in the *Journal of the Optical Society of America*, 53(8), 968–974 (1963). The characteristic vectors were used to define the relationship of the ink hues and the combinations thereof used in the calculation of the color gamuts for the various ink sets listed in the following table.

For the purpose of this invention, color gamut is specified using the conventional metric generally associated with reflection prints, which is CIELAB. The 1931 CIE 2 standard observer color matching functions as well as the CIE defined illuminant D5000 were used. This information and the characteristic vectors described above were used to calculate the color gamut at a particular L* value for each set of inks, using the method described in the *Journal of Photographic Science*, 38, 163 (1990). Note that for this calculation no light scatter is assumed. The color gamut values cited in the following table represent the sum of the a* vs. b* areas at nine different L* slices (10, 20, 30, 40, 50, 60, 70, 80, and 90) calculated for each ink set. The areas at each L* slice were determined using a trapezoidal rule summation along the b* axis.

TABLE 2

Color Gamut Values

| Color Set | 4 Color Gamut Volume | 5 Color Gamut Volume | 6 Color Gamut Volume | 7 Color Gamut Volume |
|---|---|---|---|---|
| Examples 1,2,4,9 (Four-color Control) | 73110 | | | |
| Examples 1,2,4,9,3 | | 82,199 | | |
| Examples 1,2,4,9,5 | | 82,086 | | |
| Examples 1,2,4,9,6 | | 81,768 | | |
| Examples 1,2,4,9,7 | | 79,625 | | |
| Examples 1,2,4,9,8 | | 79,218 | | |
| Examples 1,2,4,9,10 | | 79,295 | | |
| Examples 1,2,4,9,11 | | 78,158 | | |
| Examples 1,2,4,9,12 | | 78,176 | | |
| Examples 1,2,4,9,13 | | 76,638 | | |
| Examples 1,2,4,9,14 | | 76,588 | | |
| Examples 1,2,4,9,15 | | 76,191 | | |
| Examples 1,2,4,9,16 | | 75,490 | | |
| Examples 1,2,4,9,3,10 | | | 89,724 | |
| Examples 1,2,4,9,3,12 | | | 87,368 | |
| Examples 1,2,4,9,5,10 | | | 88,145 | |
| Examples 1,2,4,9,5,12 | | | 87,475 | |
| Examples 1,2,4,9,3,10,14 | | | | 91,896 |
| Examples 1,2,4,9,5,10,14 | | | | 91,578 |
| Examples 1,2,4,9,6,10,14 | | | | 91,610 |
| Examples 1,2,4,9,3,10,13 | | | | 90,896 |
| Examples 1,2,4,9,5,12,14 | | | | 90,895 |
| Examples 1,2,4,9,3,12,14 | | | | 90,881 |
| Examples 1,2,4,9,17,10,14 | | | | 88,661 |
| Examples 1,2,4,9,3,12,16 | | | | 90,173 |
| Examples 1,2,4,9,18,12,14 | | | | 87,149 |

TABLE 2-continued

| Color Set | Color Gamut Values | | | |
|---|---|---|---|---|
| | 4 Color Gamut Volume | 5 Color Gamut Volume | 6 Color Gamut Volume | 7 Color Gamut Volume |
| Examples 1,2,4,9,19,12,14 | | | | 83,838 |
| Examples 1,2,4,9,17,12,13 | | | | 86,573 |
| Comp. Example 20 (HP 755CM) | 45,792 | | | |
| Comp. Example 21 (Ektacolor ® Edge II) | 56,105 (3-color) | | | |

The above results show that inks of the present invention provide color inks sets which exhibit excellent color gamuts suitable for pictorial imaging.

The invention has been described in detail with particular reference to useful embodiments thereof, but it will be understood that variations and modifications can be effected within the spirit and scope of the invention.

We claim:

1. A color ink jet ink set for color printing; comprising
   (a) a first ink comprising a carrier and a bridged aluminum phthalocyanine pigment as a cyan colorant;
   (b) a second ink comprising a carrier and a quinacridone pigment as a magenta colorant;
   (c) a third ink comprising a carrier and a non-benzidine yellow pigment as a yellow colorant; and
   (d) at least one additional ink comprising a carrier and a colorant which is:
      (i) an orange colorant comprising a Naphthol Reds, β-naphthol, diketopyrrolo-pyrrole or a disazopyrazolone pigment;
      (ii) a green colorant comprising a copper phthalocyanine green or a triarylcarbonium pigment; or
      (iii) a violet colorant comprising a quinacridone, triarylcarbonium, benzimidazolone, or a dioxazine pigment.

2. The ink jet set of claim 1 wherein the yellow pigment is Pigment Yellow 74, 97, 138, 139, 151, 154, 155, 185, 180 or mixtures thereof.

3. The ink set of claim 1 further comprising Pigment Black 7 as an additional ink.

4. The ink jet ink set according to claim 1 wherein the bridged aluminum phthalocyanine pigment is bis(phthalocyanylalumino)tetraphenyl-disiloxane.

5. The ink jet ink set according to claim 1 where the magenta pigment is Pigment Red 122.

6. The ink jet ink set according to claim 1 wherein the yellow colorant is Pigment Yellow 74 or Pigment Yellow 155.

7. The ink jet ink set according to claim 1 wherein the cyan colorant is a mixture of bis(phthalocyanyalumino)tetraphenyldisiloxane with either (a) copper phthalocyanine, or (b) hydroxyaluminum phthalocyanine or (c) both copper phthalocyanine and hydroxyaluminum phthalocyanine.

8. The ink jet ink set according to claim 1 wherein said additional ink comprises an orange colorant comprising a β-naphthol pigment or a Naphthol Reds pigment.

9. The ink jet ink set according to claim 1 wherein said additional ink comprises a green colorant comprising a copper phthalocyanine green pigment.

10. The ink jet ink set according to claim 8 comprising an additional ink of a green colorant comprising a copper phthalocyanine green pigment.

11. The ink jet ink set according to claim 1 wherein said additional ink comprises a violet colorant comprising a quinacridone or a benzimidazolone pigment.

12. The ink jet ink set according to claim 10 comprising an additional ink of a violet colorant comprising a quinacridone or a benzimidazolone pigment.

13. The ink jet ink set of claim 1 wherein each ink contains 0.1 to 10.0 weight percent of total pigment and the carrier is selected from the group consisting of water and water miscible organic solvents.

14. An ink jet printing method for printing color images, comprising the steps of:

providing an ink jet printer that is responsive to digital data signals;

loading the printer with ink receptive substrates;

loading the printer with an color ink jet ink set according to claim 1; and printing on the ink receptive substrates in response to the digital data signals.

* * * * *